(12) United States Patent
Blessing et al.

(10) Patent No.: US 9,385,952 B2
(45) Date of Patent: Jul. 5, 2016

(54) HIGH ASSURANCE PACKET ROUTER

(71) Applicant: HARRIS CORPORATION, Melbourne, FL (US)

(72) Inventors: John Blessing, Sykesville, MD (US); George P. Paskalakis, Mt. Airy, MD (US); Richard Schmalbach, Timonium, MD (US); Jeff Wroten, Pasadena, MD (US)

(73) Assignee: Harris Corporation, Melbourne, FL (US)

( * ) Notice: Subject to any disclaimer, the term of this patent is extended or adjusted under 35 U.S.C. 154(b) by 251 days.

(21) Appl. No.: 14/212,792

(22) Filed: Mar. 14, 2014

(65) Prior Publication Data

US 2015/0263945 A1   Sep. 17, 2015

(51) Int. Cl.
*H04L 12/28* (2006.01)
*H04L 12/741* (2013.01)
*H04L 29/06* (2006.01)

(52) U.S. Cl.
CPC .............. *H04L 45/74* (2013.01); *H04L 69/14* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 6,483,833 B1 * | 11/2002 | Jagannath | H04L 45/00 370/392 |
| 7,681,036 B1 | 3/2010 | Zuber et al. | |
| 8,149,730 B1 * | 4/2012 | Aybay et al. | 370/253 |
| 8,549,341 B2 * | 10/2013 | Shahid et al. | 713/500 |
| 2004/0160960 A1 * | 8/2004 | Monta et al. | 370/395.4 |
| 2004/0252722 A1 * | 12/2004 | Wybenga et al. | 370/474 |
| 2005/0083886 A1 * | 4/2005 | Ikeda | H04W 36/0011 370/331 |
| 2008/0075080 A1 * | 3/2008 | Katabi | H04L 1/1671 370/392 |
| 2009/0072858 A1 * | 3/2009 | D'Souza et al. | 326/47 |
| 2009/0097407 A1 * | 4/2009 | Buskirk et al. | 370/235.1 |
| 2009/0180441 A1 * | 7/2009 | Ikeda | H04W 36/0011 370/331 |
| 2010/0083345 A1 * | 4/2010 | Panwar et al. | 726/1 |
| 2013/0091349 A1 * | 4/2013 | Chopra | H04L 63/162 713/150 |
| 2013/0094356 A1 * | 4/2013 | Keith et al. | 370/229 |
| 2015/0131798 A1 * | 5/2015 | Chopra | H04L 9/32 380/270 |

* cited by examiner

*Primary Examiner* — Phirin Sam
(74) *Attorney, Agent, or Firm* — Fox Rothschild LLP; Robert J. Sacco; Carol E. Thorstad-Forsyth

(57) ABSTRACT

Systems (100) and methods (800) for routing packets within a Multi-Channel Communications Device ("MCCD"). The methods involve receiving a first packet (300) which has a first classification level and a second packet (300) which has a second different classification level. Subsequently, modified first and second packets (400) are generated by inserting routing headers (402) between data link layer protocol headers (308, 308') and network layer protocol headers (310, 310') of the first and second packets. Each routing header comprises an error-detecting code (512) and routing information (502) describing a route within the MCCD along which the first or second packet is to travel. The routing headers are then used by a single packet router (160) to simultaneously route the modified first and second packets through the MCCD to at least one port of a plurality of output interface ports (116, $190_1, \ldots, 190_N$) of the MCCD.

18 Claims, 5 Drawing Sheets

Packet 300

| Preamble 302 | Physical Layer Protocol Header 304 | MAC Layer Protocol Header 306 | LLC Layer Protocol Header 308 | Network Layer Protocol Header 310 | Transport Layer Protocol Header 312 | Application Layer Header 314 | Application Data 316 | FCS 318 |

FIG. 3
(Prior Art)

Packet 400

| Preamble 302 | Physical Layer Protocol Header 304 | MAC Layer Protocol Header 306 | LLC Layer Protocol Header 308' | Routing Header 402 | Network Layer Protocol Header 310' | Transport Layer Protocol Header 312 | Application Layer Header 314 | Application Data 316 | Routing Trailer 404 | FCS 318 |

FIG. 4

Routing Header 402

| Verification Record Pointer Field 502 | Egress Interface Field 504 | Length Field 506 | Tag Field 508 | Packet Identifier Field 510 | Header EDC Field 512 | Next Header Field 514 |

FIG. 5

Routing Trailer 404

| Error Flag/ Status Field 602 | Trailer EDC Field 604 |

FIG. 6

HIGH ASSURANCE PACKET ROUTER

BACKGROUND OF THE INVENTION

1. Statement of the Technical Field

The inventive arrangements relate to packet routers. More particularly, the invention concerns systems and methods for routing packets in communication equipment with a relatively high degree of assurance.

2. Description of the Related Art

Tactical radios are known in the art. Such tactical radios include, but are not limited to, a multi-channel tactical radio that runs modern networking and legacy waveforms. The multi-channel tactical radio includes up to three radio modules. The networking traffic interface to the three radio modules is an Ethernet interface. As such, a rear panel of the multi-channel tactical radio contains three external plaintext Ethernet ports supporting up to three external networks. Each external network handles data of a respective classification level of a plurality of classification levels (e.g., secret, confidential, and unclassified). The Ethernet ports can be configured for cross banding (i.e., cross from one network to another such that data from one network can be communicated over another different network), and therefore may cross from one data classification level to another classification level. In a retransmit mode, plaintext data from one radio module may need to be sent to multiple destinations. Therefore, there is a need for a high assurance, highly configurable, one to one, and one to many packet router capable of meeting Multiple Single Levels of Security ("MSLS") requirements.

In the past, various solutions for providing such a packet router have been derived. Once such solution involves including multiple levels of security within the multi-channel tactical radio. This meant physically independent and separate hardware for handling data of each classification level and/or network. In such scenarios, there was a need for control, status, alarms or key data to be collected into or distributed from a single source. This has been accomplished with cryptographic methods to ensure data is delivered to the correct channel and that no channel data "leaked across" the separation. Consequently, information from different classification levels or channels is processed by separate and distinct hardware components of the multi-channel tactical radio. Such an arrangement is computationally intensive, hardware intensive, and costly, as well as provides a multi-channel tactical radio with a relatively large overall size.

SUMMARY OF THE INVENTION

The present invention concerns systems and methods for routing packets within a Multi-Channel Communications Device ("MCCD") of a plurality of different classification levels. The methods involve receiving, at the MCCD, a first packet which has a first classification level of the plurality of different classification levels and a second packet which has a second classification level different from the first classification level. Subsequently, modified first and second packets are generated. The modified packets include headers and trailers which facilitate robust verifiable packet separation. More specifically, each modified packet includes a routing header inserted between a data link layer protocol header and a network layer protocol header thereof, as well as a routing trailer inserted between application data and a frame check sequence thereof. The routing header comprises at least an error-detecting code, routing information describing a route within the MCCD along which the first or second packet is to travel, and/or a length field specifying how many bytes of data exist between the routing header and a routing trailer. The routing trailer comprises an error flag field and an error correction code. A single packet router then uses the routing headers to simultaneously route the modified first and second packets through the MCCD to at least one port of a plurality of output interface ports of the MCCD (e.g., Ethernet ports). In some scenarios, the routing headers and trailers are removed from the packets prior to communicating the same over a network.

Notably, a plurality of data stores (e.g., storage registers) are located along the routes specified in the routing headers. While being routed by the single packet router, the first and second packets are stored in respective ones of the data stores. The data stores are self-sanitizing data stores. Consequently, the memory locations comprising the stored packets are erased when the packets are first retrieved or communicated therefrom. The self-sanitizing memory feature of the present invention allows the single packet router to simultaneously route packets of different classification levels (e.g., an unclassified classification level, a confidential classification level, and a secret classification level).

The packet router also comprises a plurality of redundant circuit elements for protecting the system against hardware failures. The redundant circuit elements are generally provided for processing each modified first and second packet. In this regard, each routing header is concurrently used by at least a portion of the plurality of redundant circuit elements to route the modified first or second packet through the MCCD. The packets output from the plurality of redundant circuit elements are compared to each other prior to communicating the modified first or second packet along an egress path of the packet router. This comparison is performed to ensure reliable delivery of the packets over various communication channels.

The packet router further employs various packet verification operations. For example, the packet router may verify that the modified first or second packet is authorized to exit the port of the MCCD, prior to forwarding the same along at least a portion of an egress path thereof. The packet router may also perform error detection and correction operations, so as to provide further assurance of reliable delivery of the packets over various communication channels.

BRIEF DESCRIPTION OF THE DRAWINGS

Embodiments will be described with reference to the following drawing figures, in which like numerals represent like items throughout the figures, and in which:

FIG. 3 is a schematic illustration of an exemplary conventional packet that is useful for understanding the present invention.

FIG. 4 is a schematic illustration of an exemplary packet that is useful for understanding the packet routing operations of the MCCD shown in FIG. 1.

FIG. 5 is a more detailed schematic illustration of the routing header of FIG. 4.

FIG. 6 is a more detailed schematic illustration of the routing trailer of FIG. 4.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

The present invention generally concerns HA Packet Routers ("HAPRs") for use in MCCDs (e.g., radios). Each HAPR is generally configured to route packetized data to and from any of a plurality of Local Area Network ("LAN") ports (e.g., 3-16 Ethernet ports) of the MCCD. In this regard, the HAPR has two modes of operation. In a first mode of operation, a single input LAN port is connected to a single output LAN port. In a second mode of operation, a single input LAN port is connected to multiple output LAN ports. At each LAN port, there is Virtual LAN ("VLAN") filtering such that each packet can be inspected prior to being output therefrom, thereby ensuring that only packets intended to be communicated over a particular network are indeed communicated thereover. Each packet has a header and a trailer such that it is verifiably separable from a stream of packets. As a packet is processed in the HAPR, copies thereof are erased from data stores. Accordingly, the HAPR is a stateless system with self-sanitizing memory elements. The HAPR also comprises redundant security circuits and is capable of simultaneously handling packets of multiple classification levels.

Figure 1:
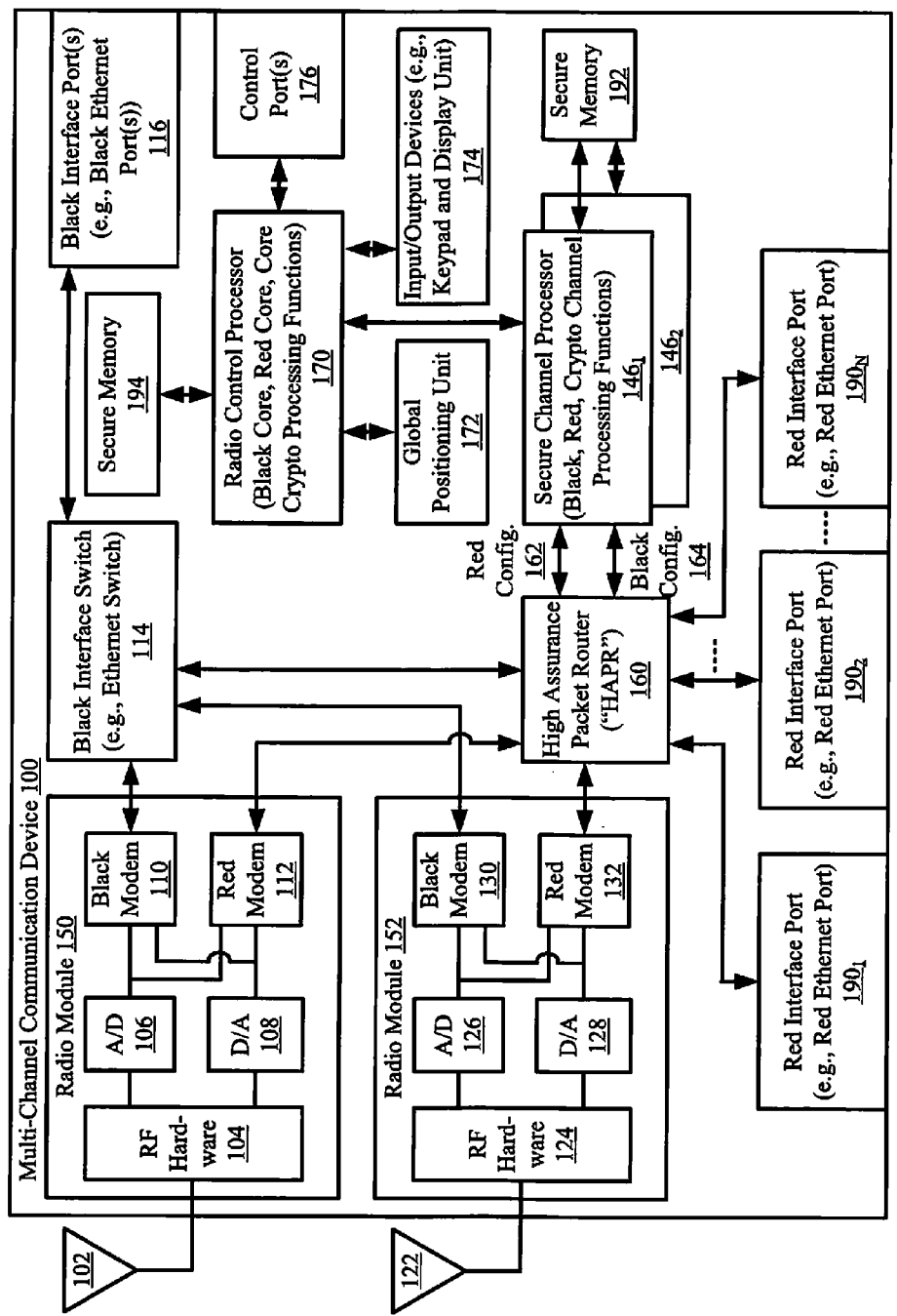
FIG. 1 is a block diagram of an exemplary MCCD that is useful for understanding the present invention.

Referring now to FIG. 1, there is provided a schematic illustration of an exemplary MCCD 100 that is useful for understanding the present invention. The MCCD 100 can include, but is not limited to, one or more Software Defined Radios ("SDRs") designed for communicating sensitive or classified data. Such a radio system typically supports many different communication waveforms, thus facilitating improved communications among users, such as government agencies and government services. The software architecture for an SDR comprises an operating environment and installed software applications, such as a waveform application and a communications application. The operating environment can include a real time operating system, a middleware component, and a framework to manage applications. An example of such an architecture is the Joint Tactical Radio System ("JTRS") Software Communications Architecture ("SCA").

As shown in FIG. 1, the MCCD 100 includes two radio modules 150 and 152. Each radio module includes, but is not limited to, an SDR. Accordingly, each radio module 150, 152 is connected to a respective antenna element 102 or 122. Each radio module 150, 152 includes Radio Frequency ("RF") hardware 104, 124, an Analog to Digital ("A/D") converter 106, 126, and a Digital to Analog ("D/A") converter 108, 128. The RF hardware 104, 124 can include filters and/or amplifiers. Each of the listed components of the radio modules 150, 152 is known in the art, and therefore will not be described in detail herein.

As also shown in FIG. 1, MCCD 100 is generally divided into two portions, namely a BLACK portion and a RED portion. The terms BLACK and RED are conventionally used to refer to areas or compartments within a piece of equipment. Where such terminology is used, it is generally true that only information that is non-sensitive (from a security standpoint) is located within the BLACK portion. Accordingly, the BLACK portion of the MCCD 100 handles data that is considered unclassified or otherwise protected from disclosure or undetected alteration. For example, such unclassified data can include, which is otherwise classified, but in an encrypted form. In contrast, the RED portion may contain both sensitive and non-sensitive information which is isolated from external threats by crypto operations of processors $146_1$, $146_2$, 170. However, in MCCD 100, there is usually classified waveform code that must reside in the BLACK portion since it is implemented by the modems 110, 130. In the present application, the terms BLACK and RED are generally used to differentiate among General Purpose Processors ("GPPs") in a channel or code of the MCCD 100.

The radio control processor 170 is generally operative to perform radio control operations. As such, the radio control processor 170 is responsible for system resource allocation and centralized system control functions, such as initiating waveform instantiation, centralized file management, and so on. The radio control processor 170 is implemented as a combination BLACK and RED core processor. Accordingly, radio control processor 170 performs BLACK core processing functions, RED core processing functions, and core crypto functions. The BLACK core processing functions include handling unclassified data communications (e.g., by controlling the operation of un-classified data channels). The RED core processing functions include handling classified data communications (e.g., by controlling the operation of classified data channels). The core crypto functions include performing cryptographic operations, such as encryption, decryption and validation of data to be handled in accordance with the BLACK and/or RED core processing functions. The radio control processor 170 is also connected to a Global Positioning Unit ("GPS") 172 and Input/Output ("I/O") devices 174. The I/O devices can include, but are not limited to a keypad, at least one display screen, and various controllers (e.g., buttons).

Each secure channel processor $146_1$, $146_2$ is operative to perform BACK channel processing functions, RED channel processing functions, and crypto channel processing functions for a particular communications channel. The BLACK channel processing functions include processing unclassified waveforms. The RED channel processing functions include processing classified waveforms. The crypto channel processing functions include performing cryptographic operations, such as encryption, decryption and validation of data to be processed in accordance with the BACK channel processing functions and/or RED channel processing functions of a secure channel processor $146_1$, $146_2$.

As noted above, the radio control processor 170 and the secure channel processors $146_1$, $146_2$ perform crypto functions. In this regard, each processor 170, $146_1$, $146_2$ is connected to respective secure memory 192, 194. The secure memory 192, 194 provides a storage device for random numbers and integrity check values. The random numbers and integrity check values can be stored in secure memory 192, 194 in accordance with any given populating scheme. For example, the random numbers and the integrity check values can be stored in a table format such that each number or value is associated with a particular operating environment and/or software application. Cryptographic functions as described herein are known in the art and therefore will not be described herein.

As shown in FIG. 1, the MCCD 100 further comprises at least one black interface port 116 (e.g., a BLACK Ethernet port), at least one control port 176, and at least one red interface port $190_1, 190_2, \ldots, 190_N$ (e.g., RED Ethernet port). N can have any integer value selected in accordance with a particular application. For example, N can have a value within the range of three to sixteen, inclusive. Each of the above listed components and ports of the MCCD 100 are known to persons skilled in the art. Thus, these components and ports will not be described in detail herein. However, it should be understood that the interface ports $116, 190_1, 190_2, \ldots, 190_N$ allow the MCCD 100 to network with another MCCD or system.

The BLACK interface switch 114 is provided for selectively routing digital data between the BLACK modems 110, 130 and the BLACK interface port(s) 116. In some scenarios, the BLACK interface port(s) 116 is(are) Ethernet ports, and therefore the black interface switch 114 is a BLACK Ethernet switch. Ethernet ports and switches are known in the art, and therefore will not be described in detail herein.

The BLACK interface switch 114, RED modems 112, 132 and secure channel processors $146_1, 146_2$ are coupled to the HAPR 160. The HAPR 160 is generally operative to route packetized data between the listed components 112, 114, 132, $146_1, 146_2$ and the interface ports $116, 190_1, 190_2, \ldots, 190_N$. In this regard, the HAPR has two modes of operation. In a first mode of operation, a single input interface port $116, 190_1, 190_2, \ldots,$ or $190_N$ is connected to a single output interface port $116, 190_1, 190_2, \ldots,$ or $190_N$. In a second mode of operation, a single input interface port $116, 190_1, 190_2, \ldots,$ or $190_N$ is connected to multiple output interface ports $116, 190_1, 190_2, \ldots,$ or $190_N$. At each BLACK/RED interface port, there is filtering (e.g., VLAN filtering) such that each packet can be inspected prior to being output therefrom, thereby ensuring that only packets intended to be communicated over a particular network are indeed communicated thereover. The HAPR will be described in more detail below in relation to FIG. 7.

Figure 2:
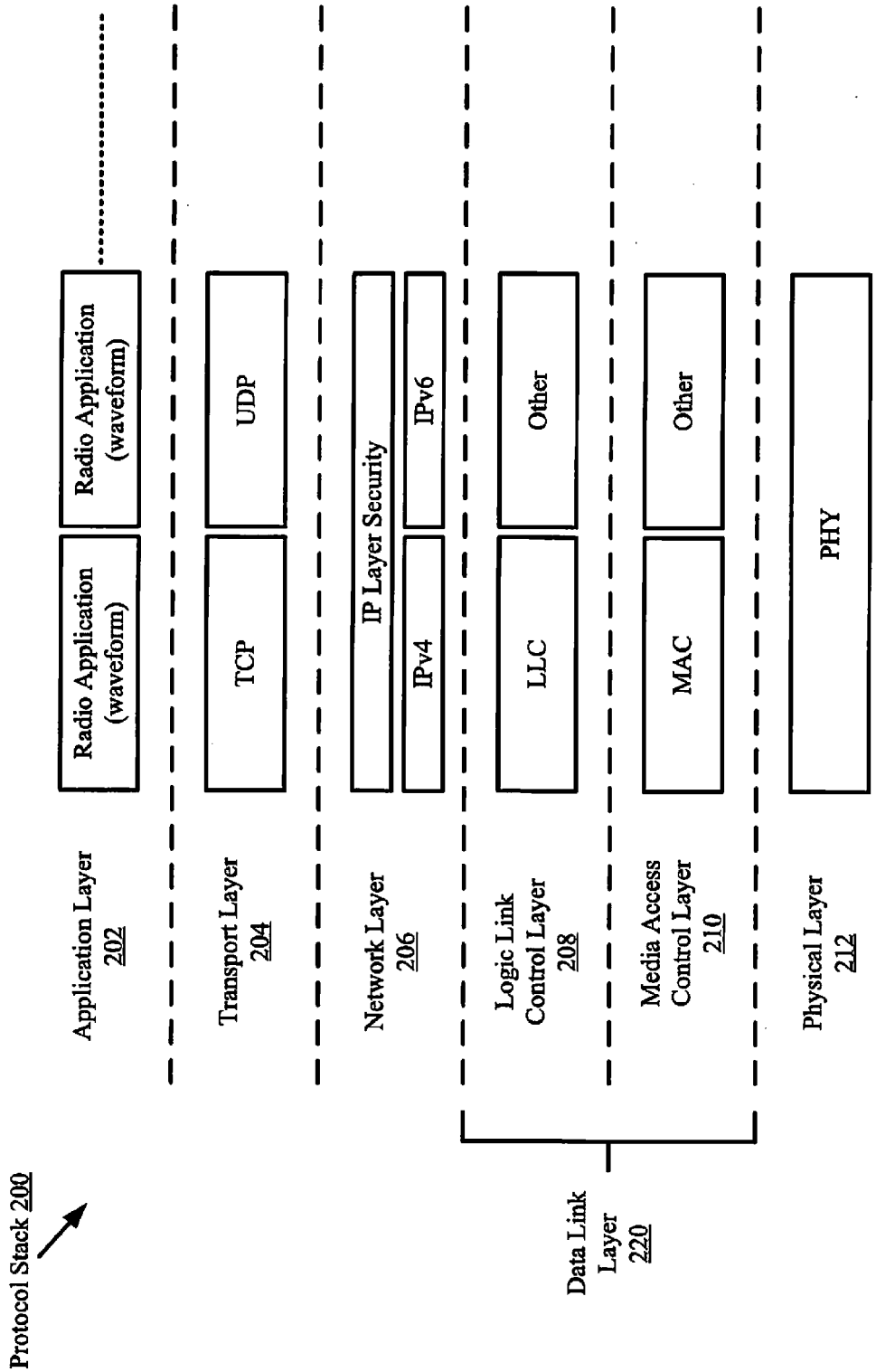
FIG. 2 is a schematic illustration of a protocol stack for the MCCD of FIG. 1 that is useful for understanding the present invention.

Referring now to FIG. 2, there is provided a protocol stack 200 for a packet based communication device (e.g., the MCCD 100) that is useful for understanding the present invention. In some scenarios, the protocol stack 200 includes five layers 202, 204, 206, 220, 212 specifying particular functions of the packet based communication system. Still, the invention is not limited in this regard. The protocol stack 200 can include any number of layers in accordance with a particular packet-based communications device application.

The protocol stack 200 provides a framework illustrating how information is passed from a software application installed in the communications device (e.g., MCCD 100 described above in relation to FIG. 1) to a software application installed in another communications device or system. The protocol stack 200 is well known to persons skilled in the art. Thus, protocol stack 200 will not be described in detail herein. However, a brief discussion is provided below to assist a reader in understanding the HAPR packet routing operations (described below in relation to FIGS. 7-8).

As shown in FIG. 2, protocol stack 200 is comprised of a plurality of protocol layers. The term "protocol", as used herein, refers to a set of rules defining how information is exchanged between network nodes. Such network nodes include, but are not limited to, MCCDs (e.g., MCCD 100 of FIG. 1). More specifically, the protocol stack 200 includes a physical layer 212, a data link layer 220, a network layer 206, a transport layer 204, and an application layer 202.

The physical layer 212 is comprised of firmware and/or hardware configured to send and receive data through a network. The data link layer 220 provides transmission protocols for transferring data between network nodes (e.g., MCCDs). Such transmission protocols include an Ethernet protocol (or an IEEE802.3 protocol), a point-to-point protocol, an IEEE802.11 protocol, an IEEE802.15 protocol, an IEEE802.16 protocol, and other such protocols.

The data link layer 220 can be comprised of two (2) sublayers, namely a Logic Link Control ("LLC") layer 208 and a Media Access Control ("MAC") layer 210. The LLC layer 208 is comprised of firmware and/or hardware configured to multiplex protocols prior to being transmitted over the MAC layer 210 and to de-multiplex protocols subsequent to being transmitted and upon receipt. The LLC layer 208 is also comprised of firmware and/or hardware configured to provide flow control of packets, detection of packets, and retransmission of dropped packets.

The MAC layer 210 is comprised of firmware and/or hardware configured to determine when to transmit communications and when to receive communications. In this regard, the MAC layer 210 performs actions involving coordinating access to a shared radio channel and utilizing protocols that enhance communications over a wireless link. The MAC layer 210 provides transmission protocols for transferring data between network nodes. Such transmission protocols include MAC protocols. MAC protocols ensure that signals sent from different nodes across the same channel do not collide.

The network layer 206 is comprised of firmware configured to transfer data from one node to another node. In this regard, the network layer 206 provides protocols for transferring data from one node to another node. The transmission protocols include routing protocols and forwarding protocols. Such transmission protocols include internet protocols (e.g., IPv4 and/or IPv6) and internet security protocols (e.g., IP layer security).

The transport layer 204 comprises firmware configured to communicate data between end systems. In this regard, the transport layer 204 provides transport protocols for transmission of data between end systems. Such transport protocols include a Transmission Control Protocol ("TCP") and a User Datagram Protocol ("UDP").

The application layer 202 is generally implemented only in firmware. The application layer 202 provides signaling protocols for end-user applications, such as authentication applications, data syntax applications, quality of service applications, waveform generation applications, and end-user applications.

Referring now to FIG. 3, there is provided a schematic illustration of an exemplary packet 300 that is useful for understanding the present invention. Notably, packet 300 has a header portion and a trailer portion such that it is verifiably separable from a stream of packets. Specifically, packet 300 comprises a preamble 302, a physical layer protocol header 304, a MAC layer protocol header 306, an LLC protocol header 308, a network layer protocol header 310, and a transport layer protocol header 312. The packet 300 is also comprised of an application layer header 314, application data 316, and a Frame Check Sequence ("FSC") 318. The phrase "Frame Check Sequence ("FSC")", as used herein, refers to extra checksum characters added to a packet or a frame in a communication protocol for error detection and correction. The FCS 318 is calculated at the MAC protocol layer of the protocol stack. Each of the listed components of the packet 300 are well known to persons skilled in the art and are well defined in open industry standards of the Institute of Electrical and Electronics Engineers ("IEEE") Standard for Local and Metropolitan Area Networks and Internet Engineering Task Force ("IEFT"). Thus, such components will not be described herein.

However, it should be appreciated that the application data 316 can be signaling protocol data user data, or management data. The user data can include voice data, video data, or the like. The application data 316 is encapsulated between the application layer header 314 and the FCS 318. The application layer header 314 is encapsulated between the transport layer protocol header 312 and the application data 316. Similarly, the transport layer protocol header 312 is encapsulated between the network layer protocol header 310 and the application layer header 314. Likewise, the network layer protocol header 310 is encapsulated between the LLC protocol header 308 and the transport layer protocol header 312. The LLC layer protocol header 308 is encapsulated between the MAC layer protocol header 306 and the network layer protocol header 310. The MAC layer protocol header 306 is encapsulated between the physical layer protocol header 304 and the LLC layer protocol header 308. The physical layer protocol header 304 is encapsulated between the preamble 302 and the MAC layer protocol header 306.

Referring now to FIG. 4, there is provided a schematic illustration of an exemplary packet 400 that is useful for understanding the HAPR routing operations described herein. Packet 400 comprises the same or similar components 302-318 as packet 300, as well as additional routing information for routing the packet to and from interface ports 116, $190_1, 190_2, \ldots, 190_N$ of the MCCD 100. Notably, the LLC layer protocol header 308' and/or the network layer protocol header 310' of packet 400 include(s) some additional information indicating that the next header comprises the routing information (e.g., a field value of 80 CD).

As shown in FIG. 4, the routing information is included within a routing header 402 and a routing trailer 404. The routing header 402 is inserted between the data link layer protocol headers 306/308 and the network layer protocol header 310. As such, the routing header 402 is encapsulated between headers 308 and 310. The routing header 402 generally contains routing information, information identifying start and end points providing separation, and an Error Detecting Code ("EDC"). The EDC can include, but is not limited to, a Cyclic Redundancy Check ("CRC") code. The routing trailer 404 generally contains error information and an EDC (e.g., a CRC code). EDCs and CRCs are well known in the art, and therefore will not be described herein.

In some scenarios, the routing header 402 and the routing trailer 404 are removed from the packet 400 prior to being sent to a final destination (e.g., another MCCD) over a network. In other scenarios, the routing header and trailer 402, 404 are not removed from the packet 400 prior to being communicated to another external device.

A more detailed schematic illustration of the routing header and trailer 402, 404 is provided in FIGS. 5-6. As shown in FIG. 5, the routing header 402 comprises a Verification Record Pointer ("VRP") field 502, an egress interface field 504, a length field 506, a tag field 508, a packet identifier field 510, a header EDC field 512, and a next header field 514. In some scenarios, the VRP field 502 includes a plurality of bytes (e.g., three (3) bytes) of information describing what route the packet 400 is to travel within a HAPR (e.g., HAPR 160 of FIG. 1), what BLACK/RED interface port(s) of the MCCD the packet is supposed to egress, and which policy checks are supposed to be executed on the packet 400 for determining whether the packet should be dropped or further processed by the HAPR. The egress interface field 504 includes at least one (1) byte of information which is added to the routing header 402 within the HAPR. Notably, the egress interface field information is redundant of some of the information contained in the VRP field 502. However, the egress interface field information is inserted into the routing header 402 for purposes of reducing the number of look ups the HAPR is required to perform during packet processing. The information contained in the egress interface field 504 indicates which BLACK/RED interface port(s) the packet is supposed to egress out of. The length field 506 includes a plurality of bytes (e.g., two (2) bytes) of information specifying how many bytes of data exist between the routing header 402 and the routing trailer 404. The length field information allows the HAPR to maintain packet boundaries. The length field information and EDC information indicate how long it should be for the HAPR to see the trailer EDC information (e.g., field 604 of FIG. 6). If the EDC fails, then packet integrity has been lost or errors were introduced into the data within the HAPR. The tag field 508 includes a plurality of bytes (e.g., two (2) bytes) of information useful for further filtering the packet (i.e., useful for determining when the packet should be dropped). The packet identifier field 510 includes a plurality of bytes (e.g., two (2) bytes) of information identifying the packet, which is used internal to the HAPR. The header EDC field 512 includes a plurality of bytes (e.g., two (2) bytes) of EDC information taken from the beginning of the VRP field 502 to the end of packet identifier field 510, and then over the next header field 514. The next header field 514 includes a plurality of bytes (e.g., two (2) bytes) of information indicating the type of LLC layer protocol header 308 and/or the type of network layer protocol header 310'.

Referring now to FIG. 6, there is provided a more detailed schematic illustration of the routing trailer 404 of FIG. 4. The routing trailer 404 comprises two fields, namely an error flag/status field 602 and a trailer EDC field 604. The error flag/status field 602 includes a plurality of bytes (e.g., two bytes) of information indicating any errors that occurred in the packet processing of the MCCD but did not cause the packet to be dropped. For example, the error flag/status field 602 can indicate that an FCS failure occurred in an Ethernet layer and/or that packets are being dropped because buffers of the HAPR are filled with data. The trailer EDC field 604 includes an EDC computed using an initial EDC value of the routing header 402 and an EDC over the error flag/status field 602. In some scenarios, the EDC utilizes an X.25 16-bit CRC, with polynomial $x^{16}+x^{12}+x^5+x$. The CRC is taken across all fields of the routing header 402, up to and including the next header field 514. The initial value is 0xCAFE. This CRC is used as the routing header CRC field. The corresponding routing trailer CRC field's initial value is the value of the routing header CRC field, and is calculated by taking the CRC across the Error Flags field. This CRC is used as the value of the routing trailer CRC field.

Figure 7:
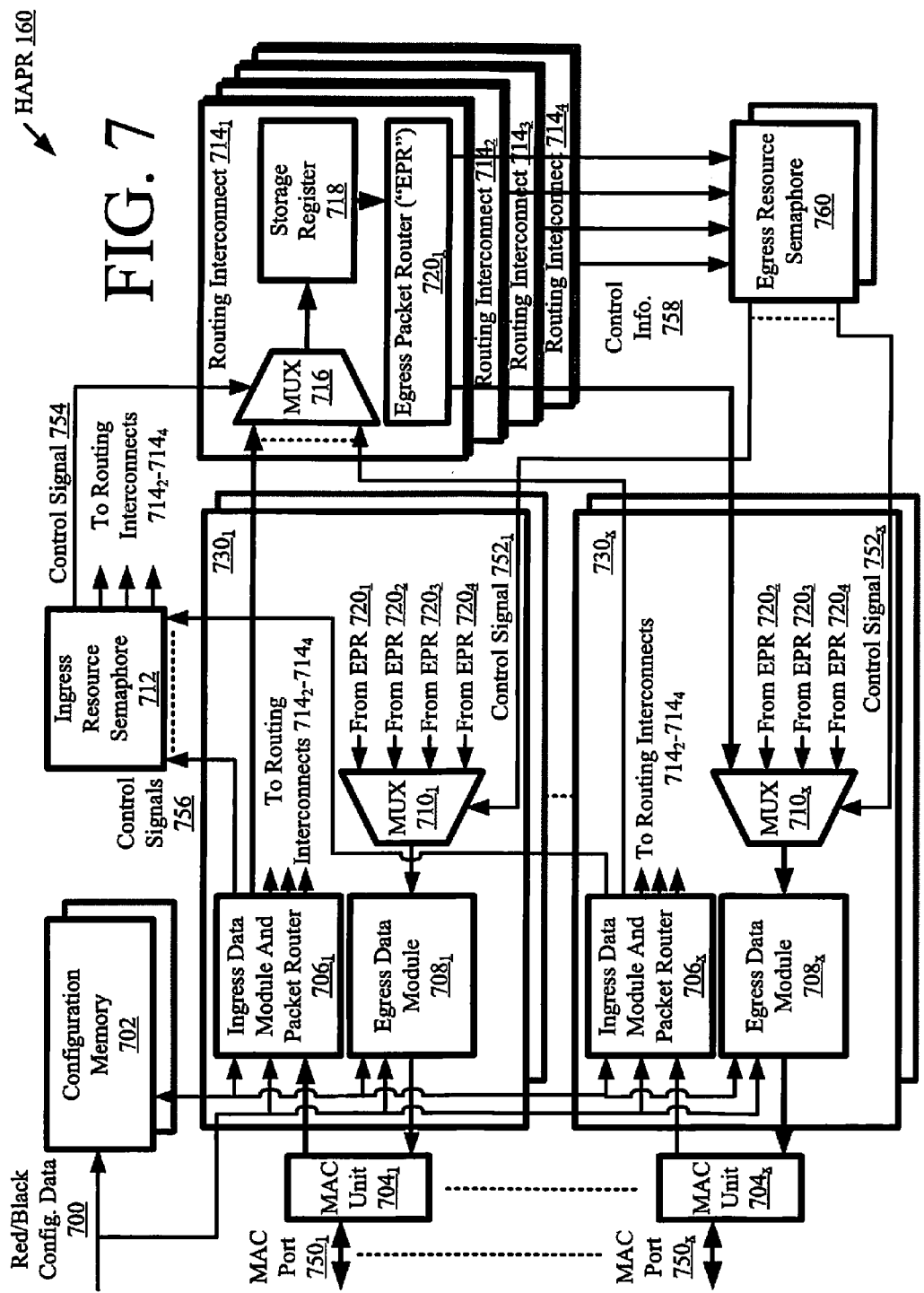
FIG. 7 is block diagram of an exemplary architecture for the HAPR of FIG. 1.

Referring now to FIG. 7, there is provided a detailed block diagram of an exemplary architecture for the HAPR 160 of FIG. 1. HAPR 160 comprises physical hardware including configuration memory 702 for storing RED/BLACK configuration data 700 (e.g., RED configuration data 162 and BLACK configuration data 164 of FIG. 1) received from at least one secure channel processor (e.g., secure channel processor $146_1$ and/or $146_2$ of FIG. 1) of an MCCD (e.g., MCCD 100 of FIG. 1). HAPR 160 also comprises an Ingress Resource Semaphore ("IRS") 712, routing interconnects $714_1, \ldots, 714_4$, an Egress Resource Semaphore ("ERS") 760, Ingress-Egress Data Units ("IEDUs") $730_1, \ldots 730_x$, and MAC units $704_1, \ldots, 704_x$. X is any integer value selected in accordance with a particular communications application. In some scenarios, X is an integer having a value equal to or between three (3) and sixteen (16).

The present invention is not limited to the exemplary architecture shown in FIG. 7. For example, the HAPR 160 can alternatively include less than or more than four (4) routing interconnects based on required data rates and quality of service of the system. Accordingly, in some scenarios, there is a one-to-one correlation between the number of routing interconnects and the MAC units.

Notably, the HAPR 160 comprises redundant security circuits which protect against hardware failures. More specifically, the HAPR 160 includes redundant circuitry for at least the configuration memory 702, the IEDUs $730_1, \ldots, 730_x$, the routing interconnects $714_1, \ldots, 714_4$, and the ERS 760, as shown in FIG. 7. Accordingly, the corresponding packet outputs from each redundant IEDU circuitry can be compared to each other within the routing interconnects $714_1, \ldots, 714_4$ to identify any hardware failures prior to communicating the packet along an egress path of the HAPR 160.

The HAPR 160 also comprises a plurality of self-sanitizing storage registers, which will become more evident as the discussion progresses. Accordingly, each storage register erases the memory location where a packet is stored as the packet is retrieved or communicated therefrom. Consequently, packets of two or more classification levels never reside in the same data store of the HAPR 160 at the same time. As such, the HAPR 160 architecture complies with the MSLS requirements.

The HAPR 160 is also able to simultaneously route packets of multiple different classification levels (e.g., an unclassified classification level, a confidential classification level, and a secret classification level). In this regard, it should be noted that operations of the HAPR 160 will generally be described below in relation to a single packet being routed therethrough. The present invention is not limited in this regard. For example, two or more packets of the same or different classification levels can be simultaneously routed through the HAPR 160. This simultaneous packet routing is at least partially achieved by employing self-sanitizing data stores along all routes and paths which packets can travel within the HAPR 160.

Referring again to FIG. 7, each MAC unit $704_1, \ldots, 704_x$ comprises an ingress Interface MAC ("IMAC") and an egress IMAC. The ingress IMAC receives packets from a respective external MAC port $750_1, \ldots, 750_x$ and forwards the received packets to the respective IEDU $730_1, \ldots, 730_x$ for processing. Each MAC port $750_1, \ldots, 750_x$ can include, but is not limited to, the BLACK interface port 116 of FIG. 1 or a RED interface port $190_1, \ldots,$ or $190_N$ of FIG. 1. The egress IMAC communicates packets from the HAPR 160 to the respective external MAC port $750_1, \ldots, 750_x$ so that the packets can be transmitted over a network.

Each IEDU $730_1, \ldots, 730_x$ comprises an Ingress Data Module and Packet Router ("IDMPR") $706_1, \ldots, 706_x$, an Egress Data Module ("EDM") $708_1, \ldots, 708_x$, and a MUX ("MUX") $710_1, \ldots, 710_x$. The IDMPR (e.g., IDMPR $706_1$) includes an Ingress Data Module ("IDM") configured to receive a packet (e.g., packet 300 of FIG. 3 or packet 400 of FIG. 4) from the IMAC of the respective MAC unit (e.g., MAC unit $704_1$), optionally modify the packet (e.g., packet 300 of FIG. 3) by inserting a routing header (e.g., routing header 402 of FIG. 4) and a routing trailer (e.g., routing trailer 404 of FIG. 4) therein so as to obtain a modified packet (e.g., packet 400 of FIG. 4), and store the modified packet in a storage register (not shown) thereof. The routing header and trailer are inserted based on RED/BLACK configuration data 700 (e.g., RED configuration data 162 and/or BLACK configuration data 164 of FIG. 1) obtained from at least one secure channel processor (e.g., secure channel processor $146_1$ and/or $146_2$ of FIG. 1). In some scenarios, the RED/BLACK configuration data 700 specifies to which output ports the packet is to be routed, as well as any packet checking information (e.g., tag field information or source address information). The storage register (not shown) is self-sanitizing, therefore erasing the memory location where the modified packet is stored as the packet is retrieved or communicated therefrom.

The IDMPR (e.g., IDMPR $706_1$) also includes an Ingress Packet Router ("IPR") configured to inspect the routing header (e.g., routing header 402 of FIG. 4) of the modified packet (e.g., packet 400 of FIG. 4) and perform look up operations to obtain routing information for the modified packet. Once the routing information is obtained by the IPR, the IPR arbitrates for access to the storage register (not shown) of the IDM. Thereafter, operations are performed to route the modified packet accordingly. For example, the modified packet can be routed to one of the routing interconnects, such as routing interconnect $714_1$.

The routing interconnect $714_1$ comprises a MUX 716 for receiving the modified packet. Inputs of the MUX 716 are selected in accordance with a control signal 754 received from the IRS 712. Control signal 754 is generated by the IRS 712 based on a control signal 756 received thereat from the IDMPR (e.g., IDMPR $706_1$). Once the modified packet is selected for output from the MUX 716, it is then passed to a storage register 718 of the routing interconnect $714_1$ for temporary storage therein. The storage register 718 is self-sanitizing, therefor erasing the memory location where the modified packet is stored as the packet is communicated to the egress IMAC of at least one MAC unit $704_1, \ldots, 704_x$.

During egress operations, the modified packet travels along a path including an Egress Packet Router ("EPR") (e.g., EPR $720_1$ of EPRs $720_1, 720_2$ (not shown), $720_3$ (not shown), $720_4$ (not shown)) of the routing interconnect (e.g., routing interconnect $714_1$). The EPR (e.g., EPR $720_1$) inspects the routing header (e.g., routing header 402 of FIG. 4) for destination information and arbitrates for access to an EDM (e.g., EDM $708_x$) of at least one IEDU (e.g., IEDU $730_x$) to determine whether the EDM is ready to receive the packet. When the HAPR 160 is in its' second mode of operation (i.e., a single input LAN port is connected to multiple output LAN ports), then the EPR waits for all destination EDMs to be ready to handle the packet before forwarding the packet concurrently to all the destination IEDUs $730_1, \ldots, 730_x$.

At the destination IEDU(s) (e.g., IEDU $730_x$), the packet is received by a MUX, such as MUX $710_x$, thereof. The inputs to the MUX $710_x$ are selected in accordance with a control signal (e.g., control signal $752_x$ of control signals $752_1, \ldots, 752_x$) received from the ERS 760. The control signal is generated by the ERS 760 based on control information 758 received from the EPR(s) of the routing interconnect(s). Once the packet has been selected for output from the MUX $710_x$, it is then communicated to the EDM $708_x$.

Upon receipt of the packet, the EDM $708_x$ stores the packet in a storage register (not shown) thereof. Thereafter, the EDM $708_x$ performs VLAN filtering operations and checks if the packet is still valid. The VLAN filtering operations include, but are not limited to, analyzing the packet to ensure that the packet is authorized to exit the assigned MAC port. If the packet is not authorized to exit the assigned MAC port, then the packet is dropped by the EDM $708_x$. If the packet is authorized to exit the assigned MAC port, then the packet is checked to determine if the packet is still valid.

The packet validity check includes, but is not limited to, analyzing the values of the header EDC field (e.g., header EDC field 512 of FIG. 5), the error/flag status field (e.g., field 602 of FIG. 6), and/or the trailer EDC field (e.g., field 604 of FIG. 6) of the packet. If the packet is determined to no longer be valid, then it is dropped by the EDM $708_x$. In contrast, if the packet is still valid, then the routing header and trailer (e.g., routing header and trailer 402, 404 of FIG. 4) are optionally removed from the packet (e.g., packet 400) so as to obtain the original packet (e.g., packet 300 of FIG. 3) received by the HAPR 160.

Subsequently, the EDM $708_x$ communicates the packet (e.g., packet 300 of FIG. 3 or packet 400 of FIG. 4) to the egress IMAC of the respective MAC unit $704_x$. As noted above, the egress IMAC communicates the packet from the HAPR 160 to the respective external MAC port $750_1, \ldots, 750_x$ so that the packets can be transmitted over a network.

As evident from the above discussion of the HAPR 160, the present invention includes a novel combination of network protocol, self-sanitizing memory elements, security circuits, and routing hardware to provide a high assurance router of packetized data that meets the MSLS requirements. In the HAPR 160, there is no: unauthorized infiltration within or between channels; unauthorized infiltration of sensitive data; unauthorized exfiltration within or between channels; and unauthorized exfiltration of sensitive data. The present solution also: allows for a processing entity to distribute configuration data or collect status information to/from many channels operating at different levels of classification; could be extended to distribute encryption keys from a central database to data channels operating at different classification levels or communities of interest; and allows for the number of MAC ports to be easily scaled.

Figure 8:
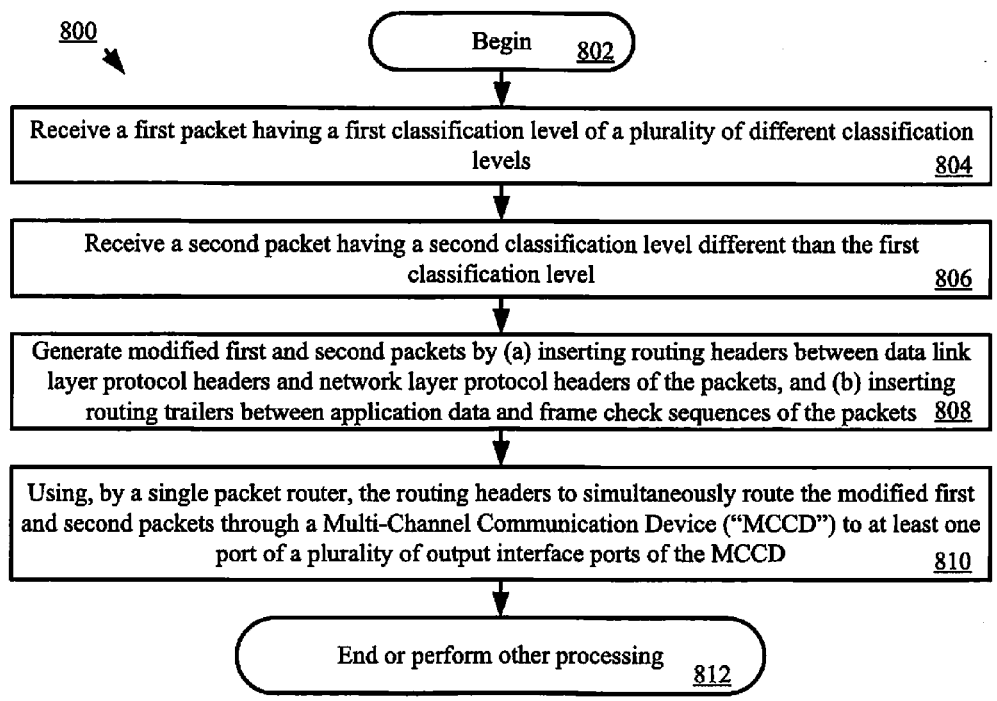
FIG. 8 is a flow diagram of an exemplary method for routing packets of a plurality of different communication levels within a communications device.

Referring now to FIG. 8, there is provided a flow diagram of an exemplary method 800 for routing packets of different classification levels within a communication device (e.g., MCCD 100 of FIG. 1). Method 800 begins with step 802 and continues with step 804. A first packet (e.g., packet 300 of FIG. 3) is received in step 804 that has a first classification level of a plurality of different classification levels (e.g., an unclassified classification level, a confidential classification level, and a secret classification level). A second packet (e.g., packet 300 of FIG. 3) is received in step 806 which has a second classification level (e.g., a classified classification level) different from the first classification level (e.g., a secret classification level).

Subsequently in step 808, modified first and second packets are generated. The modified packets include headers and trailers which facilitate robust verifiable packet separation. More specifically, each modified packet (e.g., packet 400 of FIG. 4) includes a routing header (e.g., routing header 402 of FIG. 4) inserted between a data link layer protocol header (e.g., header 308, 308' of FIGS. 3-4) and a network layer protocol header (e.g., header 310, 310' of FIGS. 3-4) thereof; as well as a routing trailer (e.g., trailer 404 of FIG. 4) inserted between application data (e.g., data 316 of FIG. 4) and a frame check sequence (e.g., frame check sequence 318 of FIG. 4) thereof. The routing header comprises at least an error-detecting code, routing information describing a route within the communication device along which the first or second packet is to travel, and/or a length field specifying how many bytes of data exist between the routing header and a routing trailer. The routing trailer comprises an error flag field and an error correction code.

In a next step 810, a single packet router (e.g., HAPR 160 of FIGS. 1 and 7) then uses the routing headers to simultaneously route the modified first and second packets through the communication device to at least one port of a plurality of output interface ports thereof (e.g., ports 116, $190_1, \ldots, 190_N$ of FIG. 1). In some scenarios, the routing headers and trailers are removed from the packets prior to communicating the same over a network.

Notably, a plurality of data stores (e.g., storage registers) are located along the routes specified in the routing headers, as described above in relation to FIG. 7. While being routed by the single packet router, the first and second packets are stored in respective ones of the data stores. The data stores are self-sanitizing data stores. Consequently, the memory locations comprising the stored packets are erased when the packets are first retrieved or communicated therefrom. The self-sanitizing memory feature of the present invention allows the single packet router to simultaneously route packets of different classification levels (e.g., an unclassified classification level, a confidential classification level, and a secret classification level).

The packet router also comprises a plurality of redundant circuit elements for protecting the system against hardware failures, as described above in relation to FIG. 7. The redundant circuit elements are generally provided for processing each modified first and second packet. In this regard, each routing header is concurrently used by at least a portion of the plurality of redundant circuit elements to route the modified first or second packet through the communication device. The packets output from the plurality of redundant circuit elements are compared to each other prior to communicating the modified first or second packet along an egress path of the packet router. This comparison is performed to ensure reliable delivery of the packets over various communication channels.

The packet router further employs various packet verification operations. For example, the packet router may verify that the modified first or second packet is authorized to exit the port of the communication device, prior to forwarding the same along at least a portion of an egress path thereof. The packet router may also perform error detection and correction operations, so as to provide further assurance of reliable delivery of the packets over various communication channels.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:
1. A method for routing packets within a Multi-Channel Communications Device ("MCCD") of a plurality of different classification levels, comprising:
    receiving, at the MCCD, a first packet which has a first classification level of the plurality of different classification levels and a second packet which has a second classification level different from the first classification level;

generating modified first and second packets by inserting routing headers between data link layer protocol headers and network layer protocol headers of the first and second packets, each routing header comprising routing information describing a route within the MCCD along which the first or second packet is to travel;

using the routing headers by a single packet router to sequentially route the modified first and second packets through the MCCD to at least one port of a plurality of output interface ports of the MCCD.

2. The method according to claim 1, wherein the modified first packet is further generated by inserting a routing trailer between application data and a frame check sequence of the first packet.

3. The method according to claim 2, wherein the routing header further comprises a length field specifying how many bytes of data exist between the routing header and a routing trailer of the first packet.

4. The method according to claim 2, wherein the routing trailer comprises an error flag field and an error correction code.

5. The method according to claim 1, further comprising:
storing the modified first or second packet in at least one data store of the single packet router located along the route specified in the routing header; and
erasing the modified first or second packet from the data store when first retrieved therefrom.

6. The method according to claim 1, wherein each routing header is concurrently used by a plurality of redundant circuit elements of the single packet router to route the modified first or second packet through the MCCD.

7. The method according to claim 6, further comprising comparing packets output from the plurality of redundant circuit elements prior to communicating the modified first or second packet along an egress path of the packet router.

8. The method according to claim 1, further comprising verifying, by the single packet router, that the modified first or second packet is authorized to exit the port of the MCCD, prior to forwarding the modified first or second packet along at least a portion of an egress path of the single packet router.

9. The method according to claim 1, further comprising removing the routing header from the modified first or second packet prior to being communicated over a network.

10. A Multi-Channel Communications Device ("MCCD"), comprising:
a single packet router operative to:
receive a first packet which has a first classification level of the plurality of different classification levels and a second packet which has a second classification level different from the first classification level;
generate modified first and second packets by inserting routing headers between data link layer protocol headers and network layer protocol headers of the first and second packets, each routing header comprising routing information describing a route within the MCCD along which the first or second packet is to travel; and
use the routing headers to concurrently route the modified first and second packets through the MCCD to at least one output interface port of the MCCD.

11. The MCCD according to claim 10, wherein the modified first packet is further generated by inserting a routing trailer between application data and a frame check sequence of the first packet.

12. The MCCD according to claim 11, wherein the routing header further comprises a length field specifying how many bytes of data exist between the routing header and a routing trailer of the first packet.

13. The MCCD according to claim 11, wherein the routing trailer comprises an error flag field and an error correction code.

14. The MCCD according to claim 10, wherein the single packet router comprises a plurality of data stores in which the modified first or second packet is stored when traveling along the route specified in the routing header, and wherein the modified first or second packet is erased from each of the plurality of data stores when first retrieved therefrom.

15. The MCCD according to claim 10, wherein the single packet router comprises a plurality of redundant circuit elements in which the same routing header is concurrently used to route the modified first or second packet through the MCCD.

16. The MCCD according to claim 15, wherein the single packet router is further configured to compare packets output from the plurality of redundant circuit elements prior to communicating the modified first or second packet along an egress path of the packet router.

17. The MCCD according to claim 10, wherein the single packet router is further configured to verify that the modified first or second packet is authorized to exit the port of the MCCD, prior to forwarding the modified first or second packet along at least a portion of an egress path of the single packet router.

18. The MCCD according to claim 10, wherein the single packet router is further configured to remove the routing header from the modified first or second packet prior to being communicated over a network.

* * * * *